(12) United States Patent
Clymer et al.

(10) Patent No.: US 6,882,143 B2
(45) Date of Patent: Apr. 19, 2005

(54) INDUCTIVE SENSOR

(75) Inventors: Mark Clymer, Mystic, CT (US);
Edward April, Mystic, CT (US)

(73) Assignee: Clymer Technologies, LLC, Mystic, CT (US)

( * ) Notice: Subject to any disclaimer, the term of this patent is extended or adjusted under 35 U.S.C. 154(b) by 0 days.

(21) Appl. No.: 10/408,067

(22) Filed: Apr. 4, 2003

(65) Prior Publication Data

US 2003/0222744 A1 Dec. 4, 2003

Related U.S. Application Data

(60) Provisional application No. 60/370,078, filed on Apr. 4, 2002.

(51) Int. Cl.⁷ .................................................. G01P 3/48
(52) U.S. Cl. .................................. 324/174; 324/207.15
(58) Field of Search ....................... 324/207.11, 207.13, 324/207.15–207.19, 173, 174; 336/110

(56) References Cited

U.S. PATENT DOCUMENTS

| 4,215,286 A | * | 7/1980 | Ornee ......................... 310/155 |
| 4,841,243 A | * | 6/1989 | Bishop et al. ............... 324/174 |
| 5,614,822 A | * | 3/1997 | Sakamoto et al. ........... 324/174 |

* cited by examiner

*Primary Examiner*—Ramon M. Barrera
(74) *Attorney, Agent, or Firm*—McCormick, Paulding & Huber LLP

(57) ABSTRACT

In an inductive sensor a ferrous core is provided and has generally opposed first and second ends. A winding assembly surrounds the core. First and second magnets are coupled to the first and second ends of the core and are oriented relative to one another so that like magnetic poles are opposing one another along a length defined by the core.

16 Claims, 4 Drawing Sheets

US 6,882,143 B2

INDUCTIVE SENSOR

CROSS-REFERENCE TO RELATED APPLICATIONS

This application is entitled to the benefit of and incorporates by reference essential subject matter disclosed in Provisional Patent Application No. 60/370,078 filed on Apr. 4, 2002.

FIELD OF THE INVENTION

The present invention relates generally to inductive sensors and is more specifically related to inductive sensors that incorporate a pair of magnets coupled to generally opposed ends of a ferrous core.

BACKGROUND OF THE INVENTION

Magnetic induction has been a time-honored and reliable method of measuring the speed of a rotating gear. Common applications include timing sensors for ignition control of internal combustion engines in automobiles, motorcycles, etc., as well as for monitoring engine RPM and vehicle speed. These sensors are limited by the fact that they can only function well over very small airgaps, typically 1–2 mm at best, requiring very tight tolerances between the sensor and the target gear, increasing the chances of sensor failure. Increasing the airgap would reduce tolerances required between the sensor and the target gear, resulting in significant cost savings for the manufacturers of such systems as ABS braking systems for automobiles.

Magnetic induction works on the principle that a magnetic field relative to a coil will induce a voltage into a coil which is proportional to the time rate of the relative motion. The target gear, which acts as a rotor, is generally a toothed gear made of ferromagnetic steel or it can be made of non-ferrous material with magnets embedded in it. Generally, existing sensors comprise a coil of a certain number of turns wound around a ferrous steel pole piece or ferrite bead. A magnet is placed in near proximity to the target end of the sensor. The magnet at the end of the wire ferrite bead or pole piece, the bead acting as a flux concentrator, conducts a magnetic flux path from the end of the sensor, creating a magnetic field in front of the sensor. When a ferromagnetic tooth from a rotating gear passes through this magnetic field, the resulting changes creates a cmf in the coil. With increasing speed the number of pulses per unit time increases proportionally. The increasing rate of change of magnetic flux also produces increasing pulse amplitude.

In practice, with enough windings on the coil for maximal sensitivity, an inductive sensor can sense the first tooth of a target gear as it begins to move at very slow speeds, but again, only over a very small airgap. More sensitive inductive coil sensors can be produced by increasing the number of windings, but this rapidly renders the sensor too unwieldly in size for many applications, particularly in vehicles. The present invention provides for small sensor size coupled with increased sensitivity for larger airgap use.

Based on the foregoing it is the general object of the present invention to provide an inductive sensor that improves upon or overcomes the problems and drawbacks associated with prior art sensors.

SUMMARY OF THE INVENTION

The present invention is directed in one aspect to an inductive sensor that includes a ferrous core having generally opposed first and second ends. A winding surrounds the ferrous core. A first magnet is coupled to the core at the first end and a second magnet is coupled to the core at the second end. The first and second magnets are oriented relative to one another so that like magnetic poles are opposing one another along a length defined by the core.

Preferably, the inductive sensor includes a target positioned adjacent to one of the first and second magnets. The target and the first and second magnets cooperate to define an air gap therebetween. In the preferred embodiment of the present invention, the target is a ferrous gear mounted for rotation relative to at least one of the first and second magnets. The gear defines a plurality of gear teeth so that during operation, as the gear moves relative to the sensor, each tooth, as it passes the sensor causes a change in a magnetic field generated thereby. These changes or pulses can be counted and correlated to speed via algorithms stored in a controller with which the sensor communicates.

In an embodiment of the present invention, the winding includes a bobbin that defines a bore into which the core is positioned. The bobbin has an exterior surface about which is wrapped a wire conductor. Preferably the conductor is made from copper. The bobbin is wrapped in tape that covers the wire. A housing is provided and has an interior area into which the bobbin having the wire conductor and tape wrapped therearound, the core, and the magnets, configured in the above-described manner are positioned. The housing can include either internal or external mounting threads.

In another embodiment of the present invention, a flux guide is positioned between, and coupled to the core and one of the magnets. The flux guide is formed from a ferrous material. Employing the flux guide allows the bulk of the sensor to be positioned remotely from the target with one of the first and second magnets located on the end of the flux guide being positioned proximate the target.

DETAILED DESCRIPTION OF THE PREFERRED EMBODIMENTS

Figure 1:
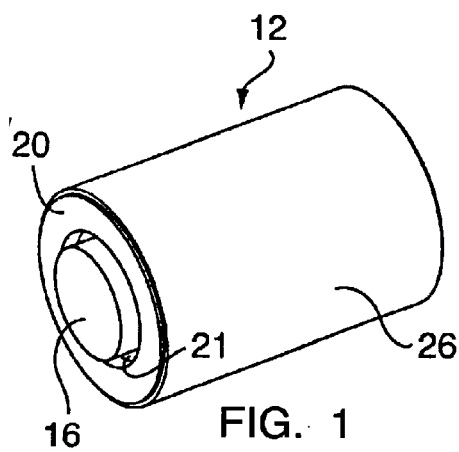
FIG. 1 is a perspective view of an inductive sensor in accordance with the present invention.
Figure 3:
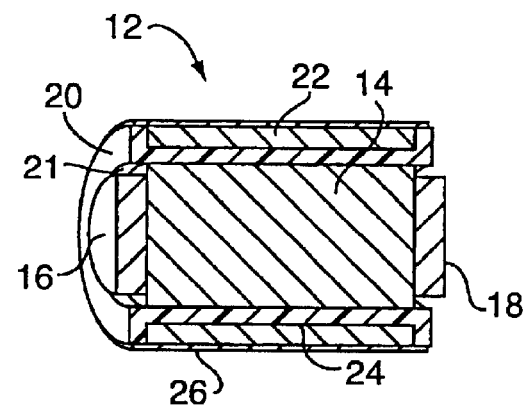
FIG. 3 is a cross-sectional, side elevational view of the inductive sensor of FIG. 1.
Figure 2:
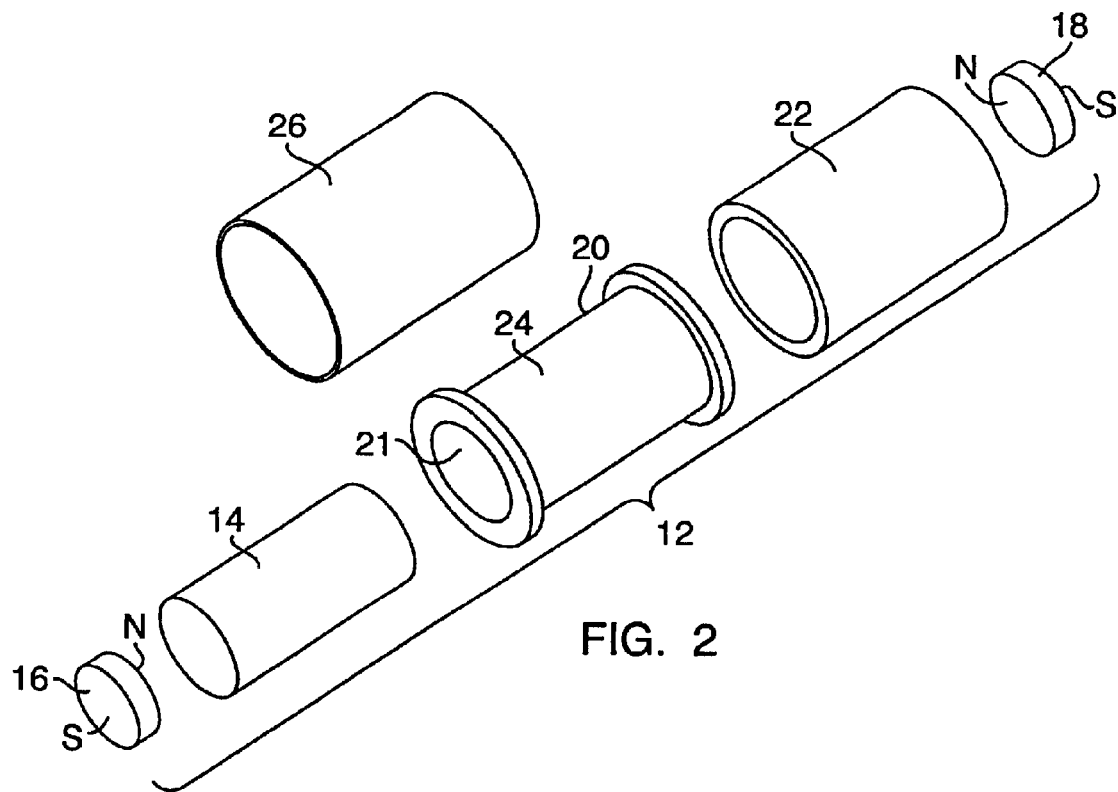
FIG. 2 is an exploded parts view of the inductive sensor of FIG. 1.

As shown in FIGS. 1–3, an inductive sensor generally designated by the reference number 12 includes a cylindrical ferrous core 14. A first magnet 16 and a second magnet 18 are attached to the ferrous core 14 and oriented such that like magnet poles, indicated by the letters "N" and "S" are opposed to one another along a length defined by the core. Preferably the magnets 16,18 are of the high energy rare earth neodymium-iron-form type, but the invention is not limited in this regard. A bobbin 20 defines a bore 22 extending therethrough into which the ferrous core 14 is positioned, the bobbin and the core being approximately coaxial with one another. An amount of conductive wire, schematically illustrated in FIGS. 2 and 3 and designated by the reference number 22 is wrapped around an exterior surface 24 of the bobbin 20. Preferably, the conductive wire is made from a suitable material, such as, but not limited to copper. In the preferred embodiment of the present invention, the conductive wire 22 is wrapped around the bobbin 20 approximately 150 times. However, the present invention is not limited in this regard as differing numbers of wire wraps can be employed without departing from the broader aspects of the present invention. Tape 26 is wrapped around the bobbin over the conductive the conductive wire. The bobbin 20, the conductive wire 22 and the tape cooperate to form a winding assembly.

Figure 4:
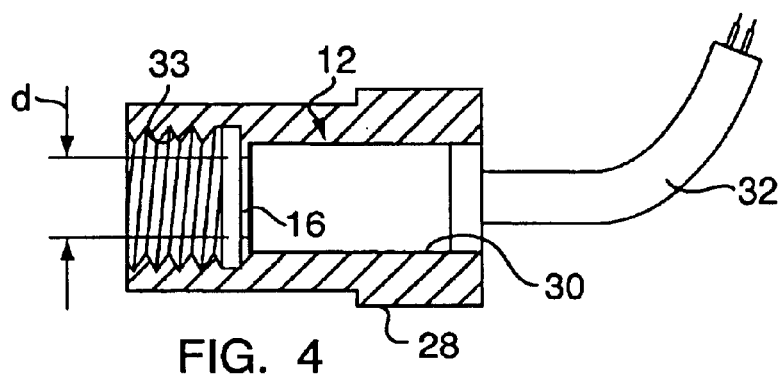
FIG. 4 is a cross-sectional side view of the sensor FIG. 1 further including a housing having internal mounting threads.
Figure 5:
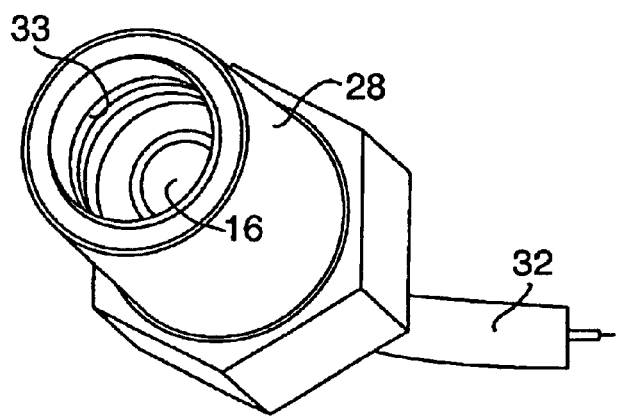
FIG. 5 is an enlarged perspective view of the sensor of FIG. 4.

As shown in FIGS. 4 and 5 the above-described sensor can also include a housing 28 that defines a bore 30 into which the sensor 12 can be located. In the illustrated embodiment, the bore 30 extends through the housing 28 and is stepped to define a diameter indicated by the letter "d" that is approximately equal to an outer diameter defined by the magnet 16 which is located in the portion of the bore 30 having the diameter "d". The housing 28 includes internal mounting threads 32 adjacent the potion of the bore 30 having the diameter "d". In addition, a two conductor cable 32 for transmitting signals generated by the sensor is coupled to the sensor. While a housing 28 having internal mounting threads 32 has been shown and described, the present invention is not limited in this regard as external mounting threads 34 can also be employed as is shown in FIG. 6.

Figure 6:
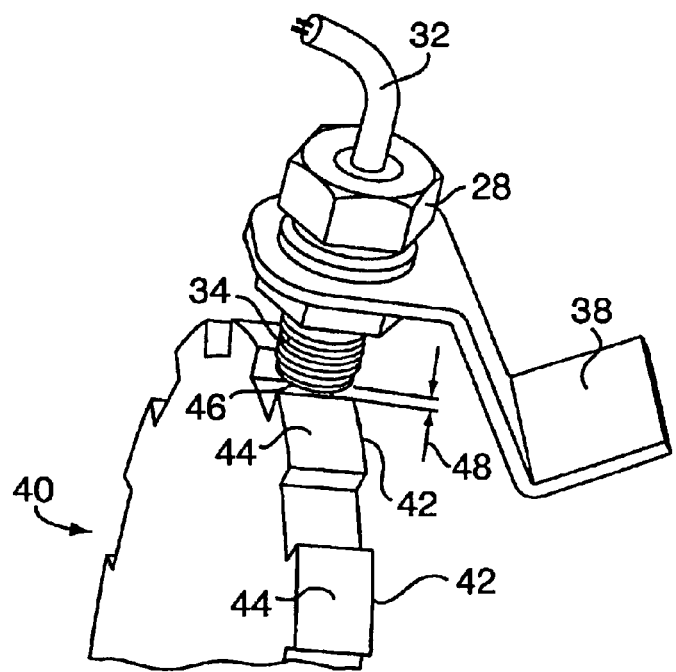
FIG. 6 is a partial perspective view of an embodiment of the inductive sensor of the present invention mounted adjacent to a target gear.

Referring to FIG. 6, the sensor is shown mounted via external mounting threads 34 to a bracket 38 which could form part of any mechanism. The sensor is positioned proximate a target generally designated by the reference number 40. In the illustrated embodiment, the target 40 is shown as a ferrous gear having a plurality of teeth 42. Each tooth 42 has an outer surface 44 which in cooperation with an end 46 of the sensor defines an air gap 48 therebetween. During operation, as the gear rotates moving relative to the sensor which is stationary, the gear teeth 44 disturb the magnetic field generated by the sensor. This disturbance is detected by the sensor which then transmits a signal to a controller (not shown). The number of disturbances or pulses can be determined over a period of time. This information in turn can be correlated to a rotational speed of the gear which can be further manipulated to correlate to a number of different parameters. For example the speed, rotational or linear, of a wheel to which the target gear 40 is directly or indirectly attached can be extrapolated.

Figure 7:
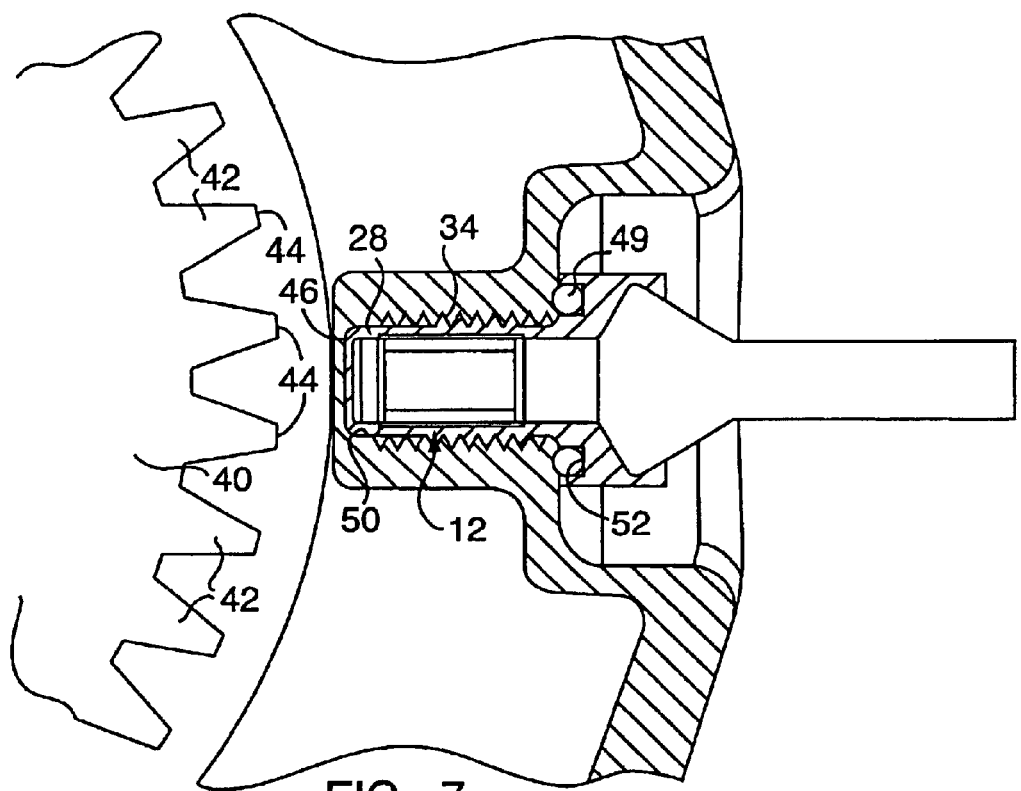
FIG. 7 is a partial, partly in section side view of an embodiment of the inductive sensor of the present invention.

FIG. 7 illustrates a sensor configured similar to that shown in FIG. 6 with the sensor mounted in a pocket 48 forming part of mechanism. An o-ring 50 is positioned in a groove 52 to seal the sensor from an outside environment.

Figure 8:
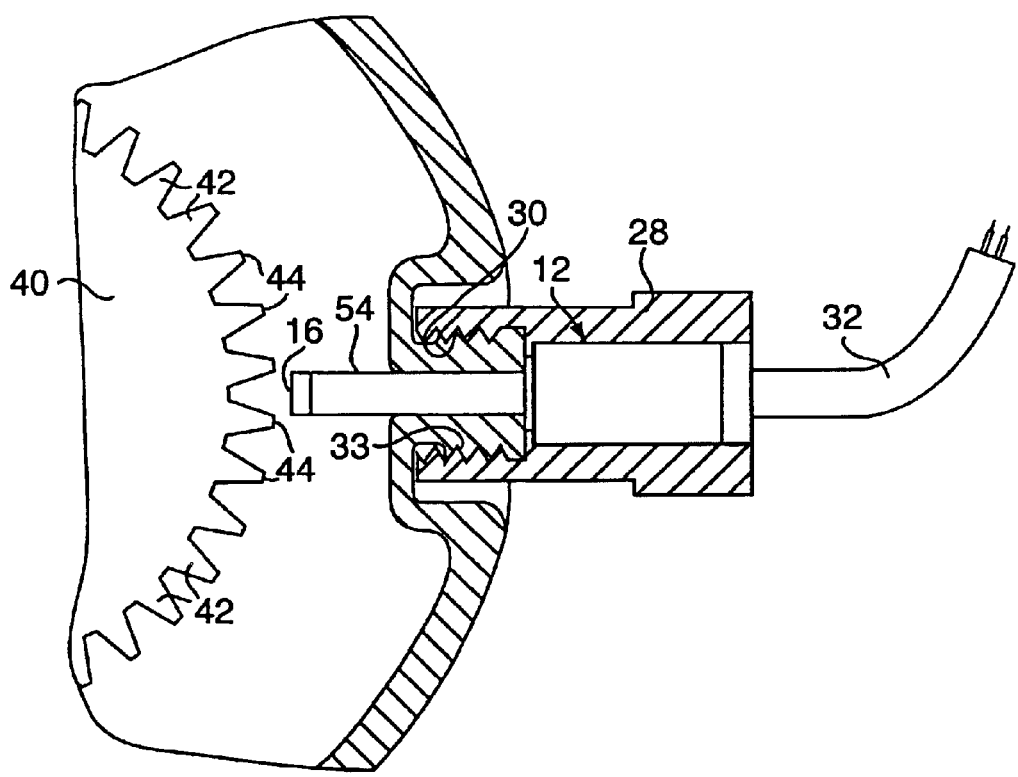
FIG. 8 is a partial, partly in section side view of an embodiment of the inductive sensor of the present invention showing a flux guide projecting outwardly from the housing and having an end located adjacent to a target gear.
Figure 9:
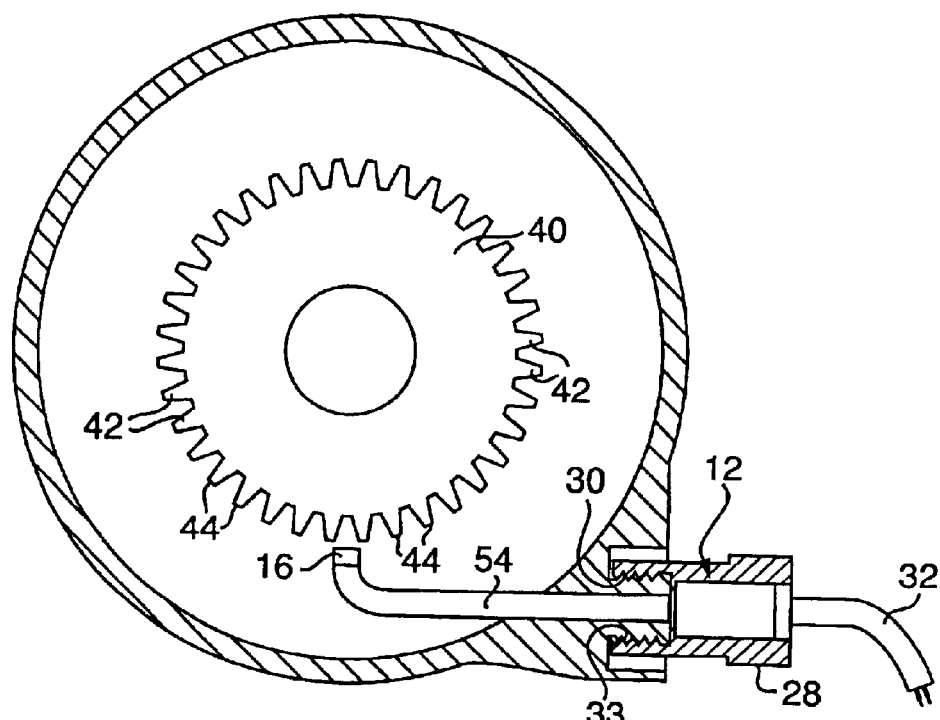
FIG. 9 shows an alternate embodiment of the inductive sensor of FIG. 8.
Figure 10:
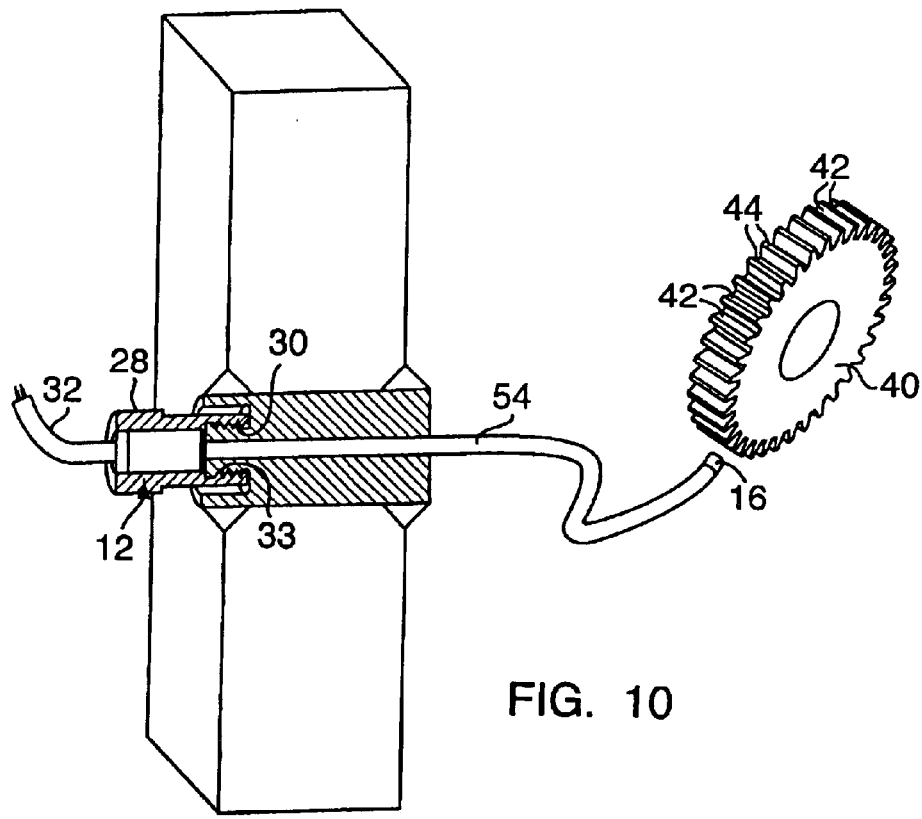
FIG. 10 shows another alternate embodiment of the inductive sensor of FIG. 8.

As shown in FIGS. 8–10, the sensor can also include a flux guide 54 made from a ferrous material and attached at one end to the ferrous core 14. The magnet 16 is attached at the other end of the flux guide. Use of the flux guide 54 allows for the sensor to be remotely mounted and the flux core bent or configured to position the magnet 16 proximate the target 40. During operation of any of the above-described sensor configurations, the field created by the opposing end magnets in the sensor design generates a null along the axis of the core allowing the change in the flux density between the sensor and the target to be measured differentially. This mode of operation sees very small changes in flux density, resulting in higher sensitivity. As far as the operation of the sensor, it appears that the end cap magnets not only cancel each other out in the center of ferrite core, but they provide a smooth variation of field level all along the axis of the core between the magnets. The variation of field level along this path provides a variation of differential permeabilities at each point along this, path and guarantees that at some point along the path the ferrite is biased to the field level of highest permeability, resulting in maximum signal. The sensor operation depends in large part upon cancellation of 2 large numbers (permanent magnet flux), measuring the small residual (due to the gear) after those 2 numbers cancel. The sensor is unusual in that one of its unique aspects is the presence of a permanent magnet directly next to the ferrite core, which biases the ferrite field level up to high dc levels.

While preferred embodiments have been shown and described, one skilled in the pertinent art to which the present invention pertains will immediately recognize that various modifications and substitutions may be made. Accordingly, it is to be understood that the present invention has been described by way of example, and not by limitation.

What is claimed is:

1. An inductive sensor comprising:

a ferrous core having generally opposed first and second ends;

a winding assembly surrounding said ferrous core; and a first magnet coupled to said core at said first end and a second magnet coupled to said core at said second end, said first and second magnets being oriented relative to one another so that like magnet poles are opposing one another along a length defined by said core;

wherein a magnetic field is generated along an axis of said ferrous core, said magnetic field being disturbable by a target positioned on said axis.

2. An inductive sensor as defined by claim 1 further comprising said target positioned adjacent to one of said first and second magnets, said target and said magnet cooperating to define an air gap therebetween, said inductive sensor detecting relative motion between said magnet and said target.

3. An inductive sensor as defined by claim 1 wherein said target is a gear having a plurality of teeth, said gear being rotatable relative to one of said magnets so that during rotation of said gear, said magnetic field is broken by each of said teeth thereby allowing said sensor to detect the passage of each tooth relative to said magnet.

4. An inductive sensor as defined by claim 1 wherein said winding assembly includes a bobbin having conductive wire wrapped around an outer peripheral surface thereof, said bobbin defining a bore extending at least part-way therethrough, and wherein said core is positioned in said bore.

5. An inductive sensor as defined by claim 4 wherein said conductive wire is copper.

6. An inductive sensor as defined by claim 5 wherein said copper wire is wrapped around said outer peripheral surface of said bobbin 150 times.

7. An inductive sensor as defined by claim 1 wherein said pair of magnets are each high energy rare earth neodymium-iron-boron disc magnets.

8. An inductive sensor as defined by claim 4 further comprising tape wrapped around said bobbin over said conductive wire.

9. An inductive sensor as defined by claim 1 further comprising:

a housing defining an interior area;

said core, said winding assembly, and said pair of magnets being positioned in said interior area;

said housing defining an opening into said interior area; and one of said magnets being positioned proximate said opening so that a surface of said magnet is exposed.

10. An inductive sensor as defined by claim 9 wherein said housing defines at least one of interior and exterior mounting threads.

11. An inductive sensor as defined by claim 1 further comprising a flux guide positioned between and coupled said core and one of said magnets.

12. An inductive sensor as defined by claim 11 wherein said flux guide is formed from a ferrous material.

13. An inductive sensor comprising:

a housing defining a bore extending therethrough;

a ferrous core positioned in said bore;

a bobbin extending around said core;

said bobbin defining an exterior surface wrapped with copper wire;

a pair of magnets each coupled to an end of said ferrous core;

a conductor coupled to said sensor for transmitting signals indicative of changes in a magnetic field generated by said sensor; and wherein said pair of magnets is oriented relative to one another so that like magnet poles are opposing one another along a length defined by said core; and wherein a magnetic field is generated along an axis of said ferrous core, said magnetic field being disturbable by a target positioned on said axis.

14. An inductive sensor as defined by claim 13, said target being positioned adjacent to one of said pair of magnets, said target and said magnet cooperating to define an air gap therebetween, said inductive sensor detecting relative motion between said magnet and said target.

15. An inductive sensor as defined by claim 13 further comprising a flux guide positioned between and coupled said core and one of said magnets.

16. An inductive sensor as defined by claim 15 wherein said flux guide is formed from a ferrous material.

* * * * *